US011097685B2

(12) United States Patent
Kennair, Jr.

(10) Patent No.: US 11,097,685 B2
(45) Date of Patent: Aug. 24, 2021

(54) TACTICAL-GEAR-ACCOMMODATING SEATBELT SYSTEM AND METHOD

(71) Applicant: Donald Kennair, Jr., Belle Chasse, LA (US)

(72) Inventor: Donald Kennair, Jr., Belle Chasse, LA (US)

( * ) Notice: Subject to any disclaimer, the term of this patent is extended or adjusted under 35 U.S.C. 154(b) by 44 days.

(21) Appl. No.: 16/803,798

(22) Filed: Feb. 27, 2020

(65) Prior Publication Data

US 2020/0247351 A1    Aug. 6, 2020

Related U.S. Application Data

(63) Continuation-in-part of application No. 15/634,086, filed on Jun. 27, 2017, now abandoned, which is a continuation-in-part of application No. 15/232,991, filed on Aug. 10, 2016, now abandoned.

(51) Int. Cl.
| | |
|---|---|
| *B60R 22/14* | (2006.01) |
| *B60R 22/30* | (2006.01) |
| *A44B 11/25* | (2006.01) |
| *B60R 22/18* | (2006.01) |
| *B60R 22/02* | (2006.01) |

(52) U.S. Cl.
CPC .......... *B60R 22/14* (2013.01); *A44B 11/2542* (2013.01); *B60R 22/30* (2013.01); *A44B 11/2546* (2013.01); *B60R 22/023* (2013.01); *B60R 2022/1812* (2013.01)

(58) Field of Classification Search
CPC .. A44B 11/2542; A44B 11/2546; B60R 22/14
See application file for complete search history.

(56) References Cited

U.S. PATENT DOCUMENTS

| | | | |
|---|---|---|---|
| 2,921,353 A * | 1/1960 | Cushman | B64D 17/32 24/632 |
| 3,106,004 A | 10/1963 | Davis | |
| 3,233,941 A | 2/1966 | Selzer | |
| 3,451,720 A | 6/1969 | Makinen | |
| 3,491,414 A | 1/1970 | Stoffel | |
| 3,523,342 A | 8/1970 | Spires | |
| 3,591,902 A | 7/1971 | Lohr | |
| 3,600,768 A | 8/1971 | Romazi, Jr. et al. | |

(Continued)

*Primary Examiner* — David R Dunn
*Assistant Examiner* — Tania Abraham
(74) *Attorney, Agent, or Firm* — Keaty Law Firm LLC

(57) ABSTRACT

A tactical-gear-accommodating seatbelt system and method adapted to provide enhanced safety and easier, more reliable means of engaging and disengaging the seatbelt for persons wearing tactical gear on the waist and chest, by providing an extender unit having an extender strap coupled with and extending from the standard seat-level receptacle or anchored in lieu of the standard seat-level receptacle, and a continuous two-way quarter-turn sure-release receptacle attached to the free end of the extender strap such that the double receptacle sits generally in front of the lower torso in use, and having receptacle fittings to accommodate separate lap and shoulder straps anchored at lower and upper anchor points, respectively, with free ends terminated in buckle tabs, thereby allowing easier and safer engagement and disengagement of the seatbelt system for a person wearing tactical gear.

14 Claims, 12 Drawing Sheets

(56) References Cited

U.S. PATENT DOCUMENTS

| | | | |
|---|---|---|---|
| 3,747,167 A * | 7/1973 | Pravaz | B64D 17/32 |
| | | | 24/573.11 |
| 3,825,979 A | 7/1974 | Jakob | |
| 4,656,700 A | 4/1987 | Tanaka | |
| 6,343,841 B1 | 2/2002 | Gregg | |
| 6,969,122 B2 | 11/2005 | Sachs et al. | |
| 7,065,843 B1 * | 6/2006 | Wu | A44B 11/2542 |
| | | | 24/631 |
| 7,263,750 B2 | 9/2007 | Keene et al. | |
| 7,753,410 B2 | 7/2010 | Coultrup | |
| 8,096,027 B2 | 1/2012 | Jung | |
| 8,276,942 B2 | 10/2012 | Van Druff et al. | |
| 8,381,373 B2 | 2/2013 | Jung | |
| 8,468,660 B2 * | 6/2013 | Holler | A44B 11/2542 |
| | | | 24/632 |
| 8,517,424 B2 | 8/2013 | Brents | |
| 8,590,935 B1 | 11/2013 | Leedy | |
| 8,631,545 B2 | 1/2014 | Ford | |
| 9,119,445 B2 | 9/2015 | Humbert | |
| 2009/0224595 A1 | 9/2009 | Pfefferman | |
| 2015/0166006 A1 | 6/2015 | Cannady | |
| 2017/0043745 A1 | 2/2017 | Noguera | |
| 2017/0327076 A1 | 11/2017 | Bennett | |
| 2018/0271224 A1 * | 9/2018 | Huang | A44B 11/2542 |

* cited by examiner

TACTICAL-GEAR-ACCOMMODATING SEATBELT SYSTEM AND METHOD

CROSS-REFERENCE TO RELATED APPLICATIONS

This application is a continuation-in-part of my co-pending application Ser. No. 15/634,086 filed on Jun. 27, 2017, which is a continuation-in-part of my co-pending application Ser. No. 15/232,991 filed on Aug. 10, 2016, the full disclosures of which are incorporated by reference herein and priority of which are hereby claimed.

BACKGROUND OF THE INVENTION

This invention provides a tactical-gear-accommodating seatbelt system and method adapted to provide enhanced safety and easier, more reliable means of engaging and disengaging the seatbelt for persons wearing tactical gear on the waist and chest.

The standard three-point seatbelt presently available in vehicles presents problems to a person wearing tactical gear at the waist and front torso, such as law officers, first responders, and military personnel. Such tactical gear might normally comprise a firearm in a holster, a stun device in a holster, a chemical agent in a spray can in a holster, a radio at the waist with an extension at the upper chest, a body camera, and several pouches to hold gear, supplies, and ammunition, all worn at the same time. In particular, if a person is wearing a holster with a relatively small armament, such as a taser, such an armament is often inadvertently removed from the holster when a standard seatbelt is unhooked and caught on the armament. The person might also be wearing bulky body armor, especially on the upper torso, which provides additional obstacles to the hooking and unhooking of a standard seatbelt. Additionally, persons wearing tactical gear often wear indicia of authority on their chests, such as badges, nametags, or collar pins. These elements often get caught in a standard seatbelt when the standard seatbelt is unhooked, causing the various indicia of authority to be snagged or ripped out completely, which in turn causes damage to the various badges and elements, and costs valuable time to recover in the vehicle.

Such persons are often called upon to enter a vehicle quickly, begin moving quickly, and exit a vehicle quickly, which may sometimes be under difficult or emergency conditions. The standard three-point seatbelt hinders a person's ability to move quickly or effectively when wearing such tactical gear. When entering a vehicle, the standard seat-level receptacle is likely behind and underneath tactical gear on a belt, such as a holster or a radio. The seat-level receptacle is therefore hard to find, hard to reach, and hard to fasten. When exiting a vehicle, the seat-level receptacle is still hard to find, reach, and unfasten, and so the person's exit from the vehicle is delayed. Also, the V-shaped segment formed by the lap and shoulder portions of the three-point seatbelt are highly prone to becoming snagged or caught on one or more pieces of tactical gear. Such snagging also hinders and delays exit from the vehicle. In extreme circumstances, such as the wreck of a vehicle, a person might be trapped in a vehicle unable to unfasten the three-point seatbelt and be forced to cut the seatbelt in order to get free. Additionally, in a situation where a person might be incapacitated, the seatbelt would have to be unfastened by another person, from either inside or outside the vehicle at a potentially difficult angle.

The current art has not solved the problems created by the above situations. For example, U.S. Pat. No. 3,600,768 issued on Aug. 24, 1971 to Louis Romanzi, Jr. et al. on an "Integral Three-Point Safety Buckle." The patent covers a safety belt and buckle construction for vehicles in which lap belt straps or webbing are provided, as well as shoulder strap means. In the apparatus, both the lap webbing and shoulder webbing are attached to the vehicle and remote therefrom, all being connected by buckle means having a plurality of detents to respectively hold the lap belt straps and shoulder strap means in the releasable latched position. In this arrangement, all of the straps may be simultaneously released by a single pushbutton means, or the shoulder strap released without releasing the lap straps.

U.S. Pat. No. 3,523,342 issued Aug. 11, 1970 to J. P. Spires on a "Seat Belt Buckle Latch." The latch covers a buckle latching mechanism formed of a pair of opposing arms having spaced-apart ends pivotally connected to the buckle housing, with opposite ends converting towards and in contact with each other during latching to form a rigid triangle. The apparatus features rollers carried by the adjacent ends, and a belt tongue slidably positioned between the pivots along the axis of the triangle and having socketed edges for rollingly receiving the rollers, thereby latching the tongue to the housing. A slidable wedge separates the arms for rollingly disengaging the rollers from the sockets to unlatch the tongue. The patent was developed because seat belt buckle latching mechanisms, of the type used in automotive vehicle and aircraft safety belts, must be designed to carry substantial applied loads without disengaging or unlatching. Thus, they are normally bulky and formed of heavy, thick materials to carry the required loads. It was thus desirable to be able to deliberately unlatch or release such latching mechanisms, even when under heavy load, with minimal applied forces, such as finger pressure upon a button. However, the size, shape, and heavy frictional forces of conventional latching mechanisms make it extremely difficult to deliberately release the mechanism when under applied load. The Spires system is concerned with a latching mechanism that may be formed of relatively lightweight, thin material, to reduce bulkiness and will readily sustain high applied loads, while at the same time due to low friction construction, that may be easily released by low-releasing pressures even when under heavy load.

U.S. Pat. No. 3,106,004, issued Oct. 8, 1963 to H. F. Davis, covers a "Multiple Separable Fastener Device for Body Harness." The harness relates to an improved multiple separable fastener device for field use in securing a wounded person to a stretcher, or for automobile drivers for holding them safely in their seats, or the like. The simplified, yet rugged, quick-release device separably fastens the terminal ends of shoulder, crotch, and/or waist straps of a body harness together, wherein each terminal end may be independently entered and individually fastened to the device; however, when required, all the terminal ends fastened to the device may be released quickly and simultaneously. The invention provides a structurally improved multiple, separable fastener device that will release all the body harness termini by the manual depression of an operating button in a direction normal to the top wall of the casing member for the device.

U.S. Pat. No. 8,381,373, issued Feb. 26, 2013 to Marc Jung, covers a "Housing for a Duel Release Twin Buckle Assembly." The patent provides for a housing assembly for twin latching mechanisms. The housing assembly includes two handles that can be pivoted to separately unlatch two belt connectors. The latching mechanisms are positioned within the housing such that when the handles are pivoted upwardly, their leading edges engage plunger mechanisms associated with the latching mechanisms. By engaging the plunger mechanisms, individual latches are disengaged and the associated belt connectors are ejected. A flange interconnects the two handles such that one or both handles are pivoted, depending upon which handle is lifted by the operator. The housing provides a secure enclosure for the latch mechanisms, and also shields the working components from the environment.

U.S. Pat. No. 8,276,942 issued Oct. 2, 2012 to Charles E. Van Druff et al. for a "Combat Vehicle Restraint System." The combat vehicle restraint system accommodates a wide range of soldiers, both with and without battle, arctic, or chemical gear. The restraint system includes lengthened belts and an adjustable buckle position. The belts include loops for locating and grasping the belts, and separate lap and shoulder belts with small narrowing ends to prevent catching on gear. The belts are extendable from Inertial reels, which are calibrated for off-road operation. The buckle engages each belt separately and includes a single action release. The buckle position is easily adjusted using an oversized knob, so a soldier may easily find and adjust buckle length in the dark, wearing heavy gloves, or with muddy, slippery fingers. The latch/unlatch mechanism and associated hardware is an open-frame type to reduce or eliminate effects of mud, dust, water, or other contaminants on operation.

U.S. Pat. No. 7,263,750 issued Sep. 4, 2007 to Allen R. Keene et al. for a "Buckle Assembly Having Single Release for Multiple Belt Connectors." The buckle assembly serves as a vehicle restraint system where the buckle assembly is adapted to receive a plurality of belt connectors, with the belt connectors being simultaneously released upon moving at least one handle to a release position. In one embodiment of the patent, the apparatus comprises a buckle assembly for attachment to a plurality of flat, plate-like belt connectors, wherein each of the belt connectors includes a latching abutment located adjacent to an upper surface thereof, comprising: (1) a buckle base having a bottom portion and parallel spaced-apart upstanding parallel flanges at least along lateral edges of the bottom portion; (2) at least two spaced-apart latching mechanisms mounted in parallel with respect to each other between the spaced-apart upstanding flanges of the bottom portion, wherein each of the spaced-apart latching mechanisms includes (a) a separate latch pawl that is spaced apart from the other one or more latch pawls, wherein each of the separate latch pawls is independently movable relative to the other one or more latch pawls to a position engaging the latching abutment of one of the belt connectors, and (b) a biasing element urging the latch pawl toward the engaging position; and (3) at least one operating handle movable between positions at which the latch pawls of the latching mechanisms are caused to engage and to disengage connection between the buckle and the belt connectors, the operating handle being configured to serve as a top cover plate for the buckle assembly.

U.S. Pat. No. 7,753,410, issued Jul. 13, 2010 to Sherri L. Coultrup for a "Tactical Seatbelt Quick Release System," covers a tactical quick release seatbelt mechanism that attaches as an after-market enhancement to a pre-existing factor installed seatbelt. The tactical quick release seatbelt mechanism expedites exit from a factory-installed three-point seatbelt, particularly in an emergency situation. The tactical quick release allows tactical users such as law enforcement, military personnel, drug enforcement personnel, Homeland Security personnel, etc., to exit a vehicle quickly, without delay or snag of tactical equipment (e.g., weapons, communications backpack, etc.) on the three-point seatbelt, and without the need to take their eye off a given target by looking down for the seatbelt release button. The quick release mechanism inherently provides some extension to the length of the factory installed seatbelt, providing that much more flexibility and maneuverability for the occupant—particularly an occupant that is forward-leaning in the seat because of their wearing a backpack or similar tactical equipment while seated in the vehicle.

U.S. Pat. No. 8,590,935, issued Nov. 26, 2013 to Wesley T. Leedy for an "Automatic Restraint Belt Safety Release System," includes an electrically-released buckle which engages a shoulder belt and a lap belt. When engaged, the system provides the protection and functionality of a common three-point seatbelt. When a user opens a vehicle door, an electric switch within the door handle provides a single to disengage the buckle, causing both the shoulder and lap belts to retract. The system thus enables the user to exit the vehicle in an expedient manner. The system is particularly useful for law enforcement officers or military personnel who need to frequently and quickly exit a vehicle. A power switch is provided to deactivate the system.

There is accordingly a need for a system that solves the problems of a person wearing tactical gear, having difficulty and therefore delay in reaching a standard seat-level receptacle to engage or disengage a standard three-point seatbelt.

SUMMARY OF THE INVENTION

This invention provides a tactical-gear-accommodating seatbelt system and method adapted to provide enhanced safety and easier, more reliable means of engaging and disengaging the seatbelt for persons wearing tactical gear on the waist and chest, by providing an extender unit having an extender strap coupled with and extending from the standard seat-level receptacle or anchored in lieu of the standard seat-level receptacle, and a continuous two-way quarter-turn sure-release receptacle attached to the free end of the extender strap such that it sits generally in front of the lower torso in use, and having receptacle fittings to accommodate separate lap and shoulder straps anchored at lower and upper anchor points, respectively, with free ends terminated in buckle tabs, thereby allowing easier and safer engagement and disengagement of the seatbelt system for a person wearing tactical gear.

This invention solves the problems of a person wearing tactical gear, having difficulty and therefore delay in reaching a standard seat-level receptacle to engage or disengage a standard three-point seatbelt, and the problems of a standard three-point seatbelt becoming caught upon the tactical gear, which impedes egress from the vehicle.

BRIEF DESCRIPTION OF THE DRAWINGS

Reference will now be made to the drawings, wherein like parts are designated by like numerals, and wherein.

DETAILED DESCRIPTION OF THE INVENTION

Figure 1:
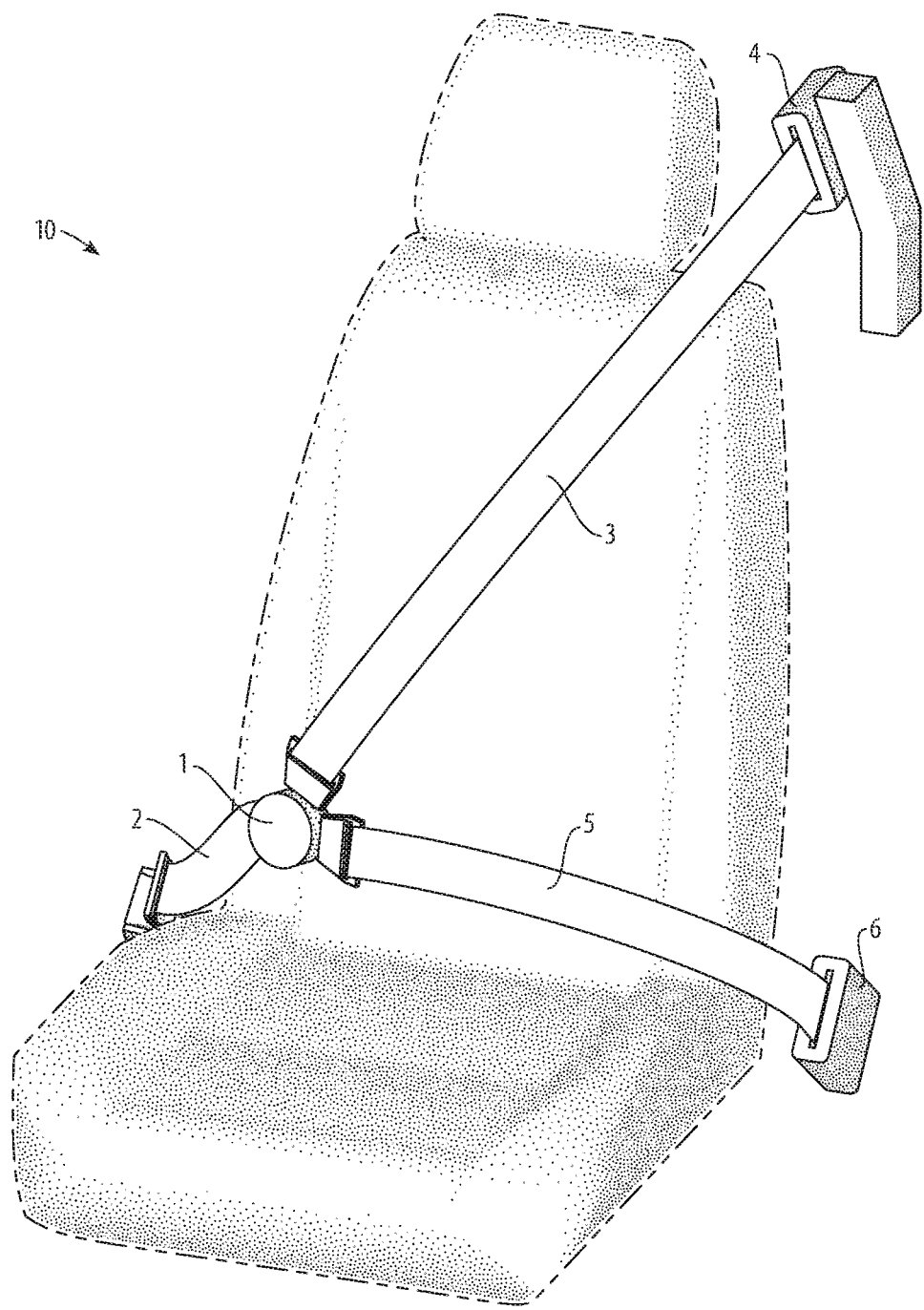
FIG. 1 is a right-front perspective conceptual view of the tactical-gear-accommodating seatbelt system and method of the invention in relation to an empty seat.

Referring to FIG. 1 and all figures generally, embodiments of the tactical-gear-accommodating seatbelt system and method 10 of the invention are illustrated.

Figure 2:
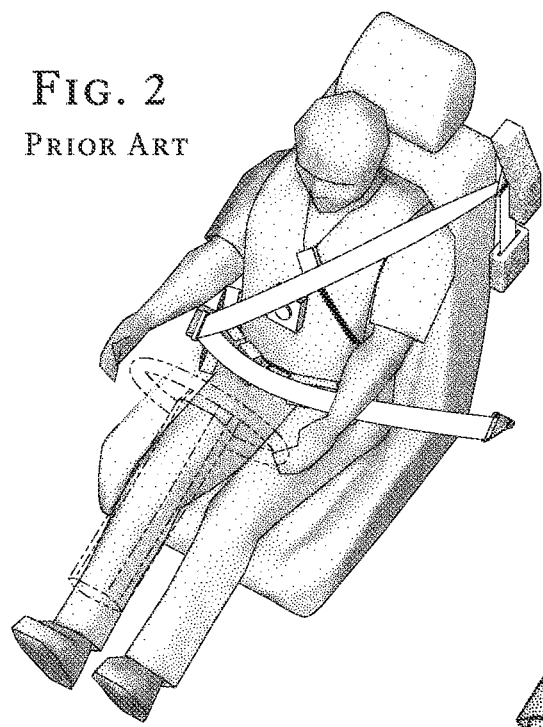
FIG. 2 is a left-front perspective view of the standard three-point seatbelt of the prior art, in use by a person wearing tactical gear.

Referring briefly to prior art FIG. 2, the standard three-point seatbelt, when used by a person wearing tactical gear on the waist and chest, has a disadvantage in that the standard seat-level receptacle is difficult to locate, reach, and manipulate with tactical gear, which may include a pistol holster for right-handed persons, or an electroshock weapon or radio transceiver for a left-handed person. This problem can lead to delays in getting a vehicle underway and delays in persons being able to exit a vehicle quickly when responding to a situation. The difficulty in locating, reaching, and manipulating this standard seatbelt could also possibly trap a person in a vehicle when unable to release the three-point seatbelt. A related problem is the tendency of the one-piece, three-point seatbelt to become caught or snagged upon one or more protruding pieces of tactical gear.

Figure 3:
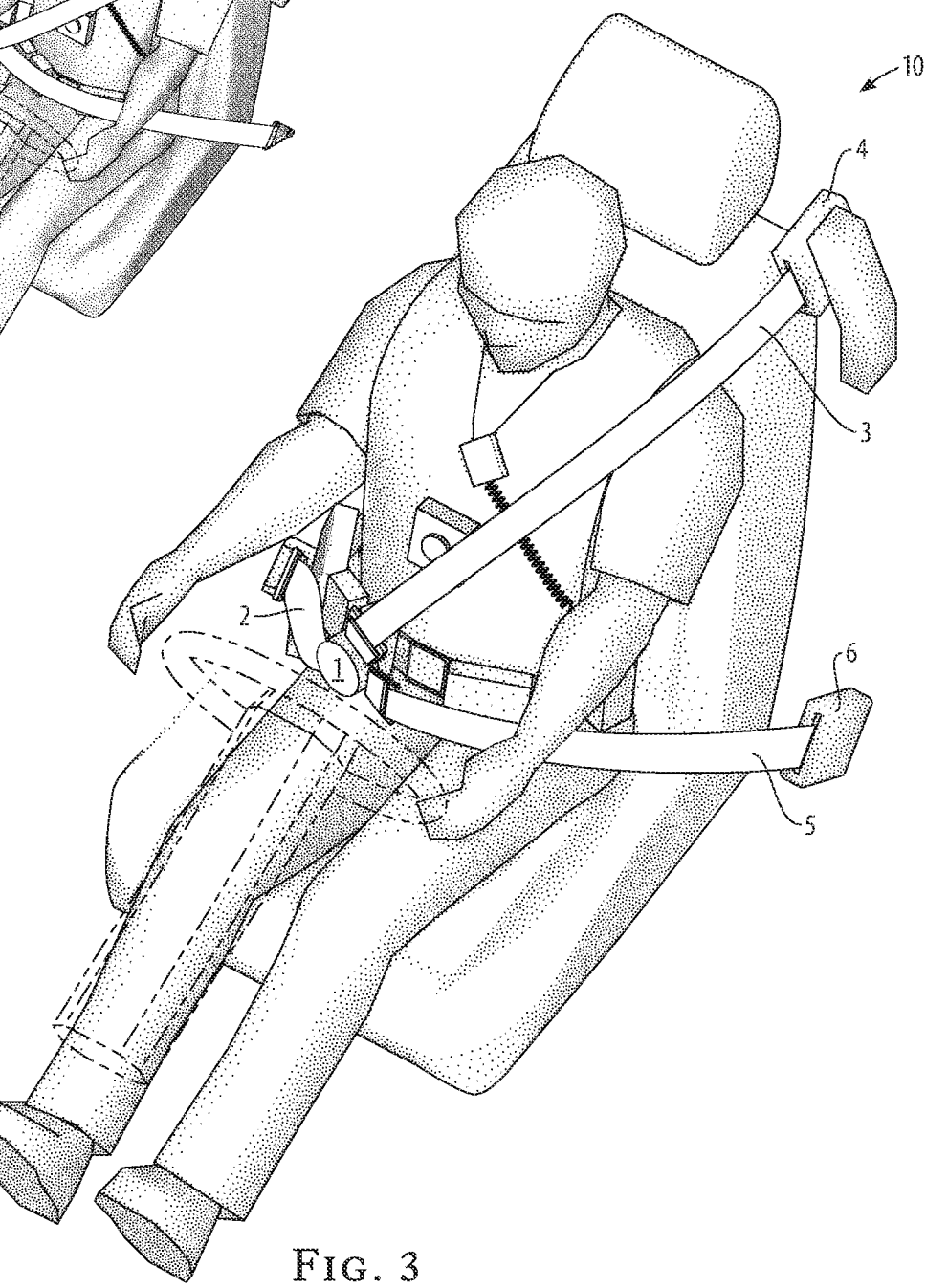
FIG. 3 is a left-front perspective view of an embodiment of the tactical-gear-accommodating seatbelt system and method of the invention, in use by a person wearing tactical gear.
Figure 4:
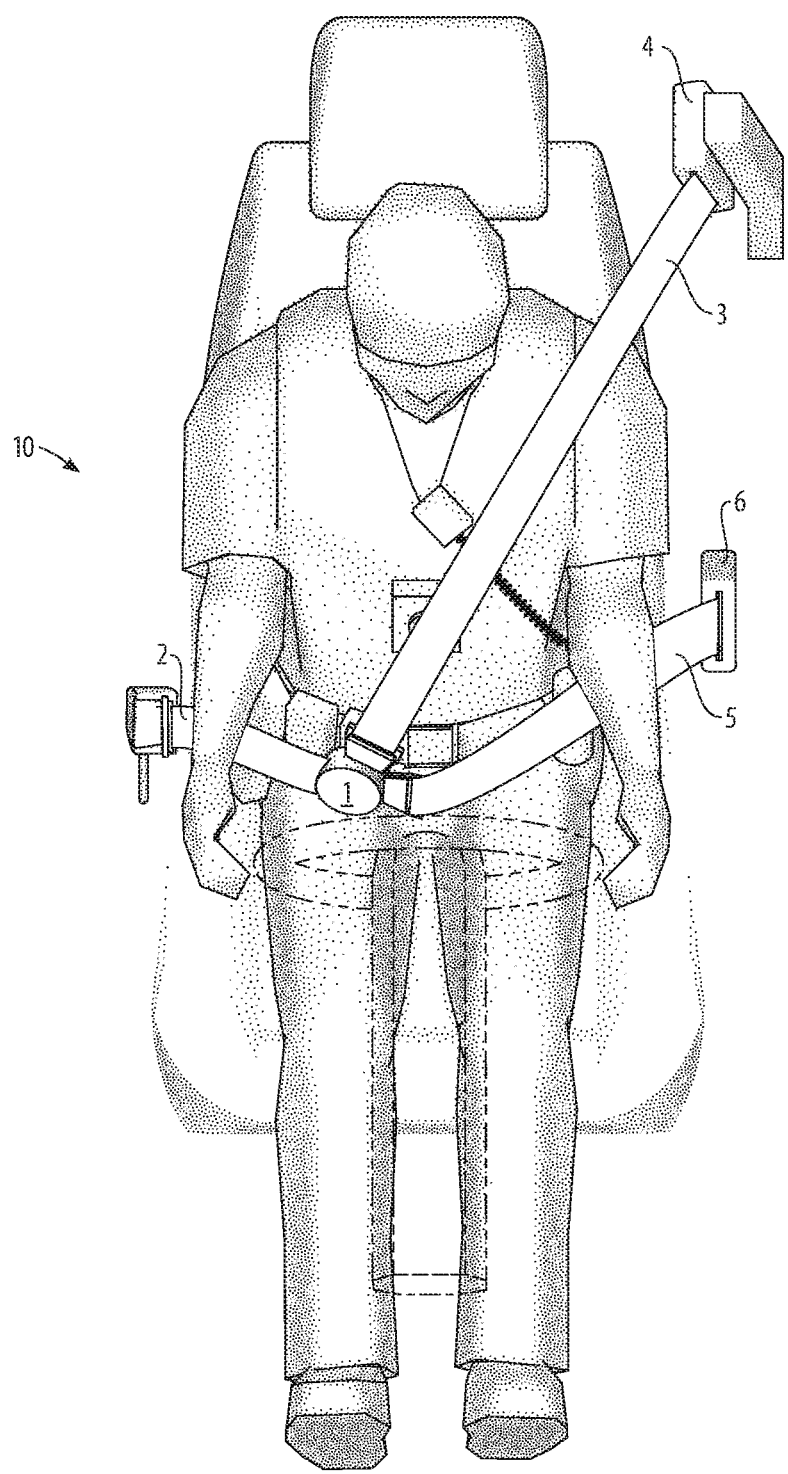
FIG. 4 is a top-front perspective view of an embodiment of the tactical-gear-accommodating seatbelt system and method of the invention, in use by a person wearing tactical gear.

Referring to FIG. 1, FIG. 3, and FIG. 4, the tactical-gear-accommodating seatbelt system and method 10 provides an extender unit made up of a continuous two-way quarter-turn sure-release receptacle 1 attached to one end of an extender strap 2. The extender strap 2 is anchored to the vehicle frame or chassis by either directly attaching, replacing the standard seat-level receptacle, for some embodiments, or by attaching to the existing standard seat-level receptacle for other embodiments, such as a retrofit embodiment.

Taking the place of the lap and shoulder portions of the one-strap standard three-point seatbelt are a separate shoulder strap, anchored at a point generally equivalent to the point where a three-point seatbelt would change directions at an anchored point, which is generally at shoulder level, and a separate lap strap, anchored at a point generally equivalent to the anchor point of a standard seatbelt, which is generally at floor level. The shoulder strap anchor unit 4 and the lap strap anchor unit 6 can be provided with a locking retractor, pretensioner, or web clamp, as known in the art.

The ends of the shoulder strap 3 and lap strap 5 opposite their respective anchor points are provided with buckle tabs which securely and removably attach to the continuous two-way quarter-turn sure-release receptacle 1. In use, the continuous two-way quarter-turn sure-release receptacle 1 sits at a point along the line of the lap belt that is essentially in front of the person's lower torso. This frontal location of the continuous two-way quarter-turn sure-release receptacle, as well as the flexibility of the extender strap 2, make the extender unit easy to find by sight or by feel, allowing for easier and quicker engagement and disengagement of the seatbelt. The continuous two-way quarter-turn sure-release receptacle 1 is adapted to provide a secure attachment which will not jam or seize up, even after application of force, such as from a wreck. In a preferred embodiment, the continuous two-way quarter-turn sure-release receptacle 1 has a rotary, partial-turn release control of a size large enough to be manipulated both by the hand of the person wearing the seatbelt, or by a different person either inside or outside the vehicle. The continuous two-way quarter-turn sure-release receptacle 1 provides securing of the buckle tabs of the shoulder strap 3 and the lap strap 5 that will withstand the force of a wreck, but will not jam, and can be released under all circumstances.

Figure 5:
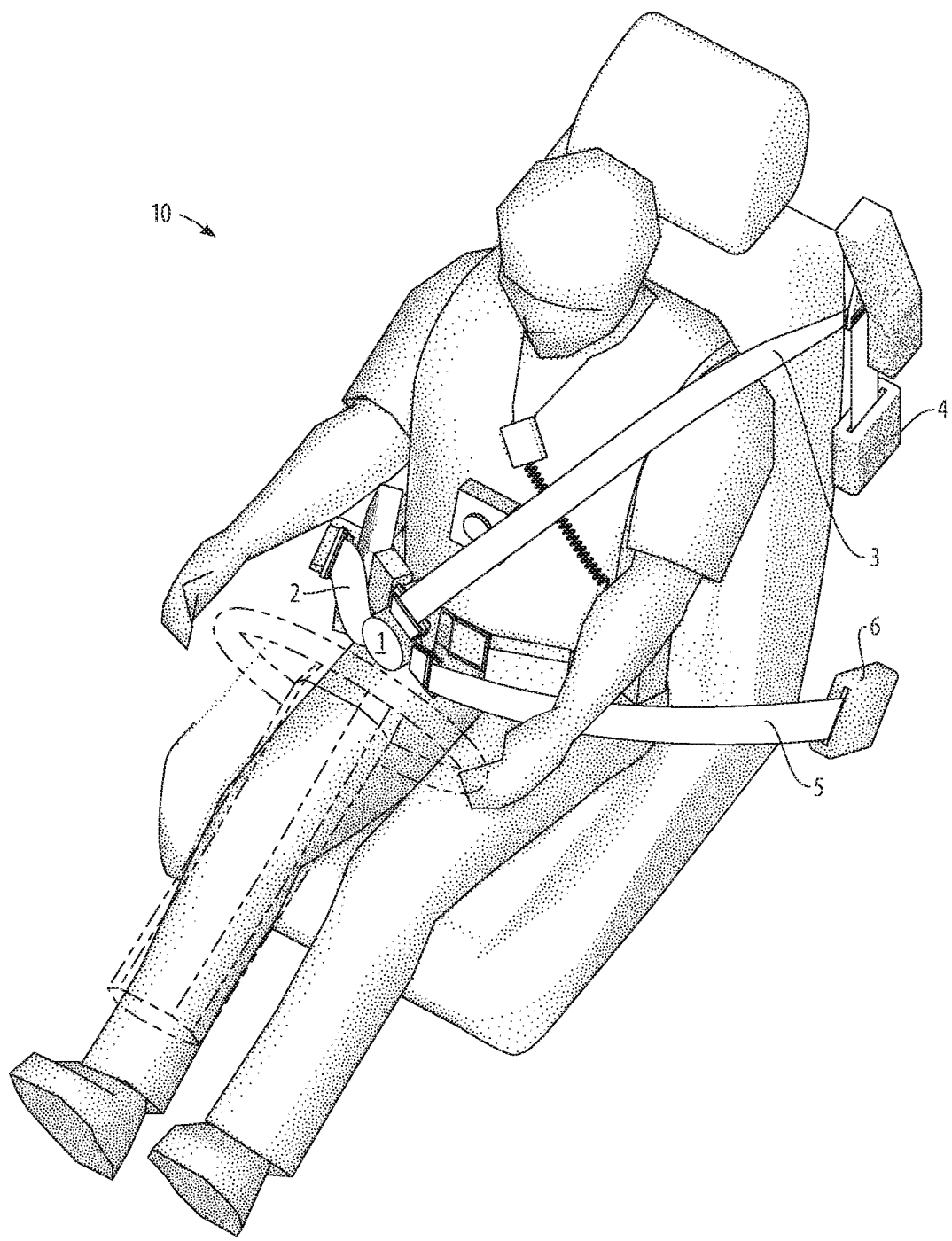
FIG. 5 is a top-front perspective view of an embodiment of the tactical-gear-accommodating seatbelt system and method of the invention, in use by a person wearing tactical gear.

Referring to FIG. 5, the shoulder strap anchor unit 4 can be located at a place other than the actual effective anchor point, and can be passed through a fitting that allows a change of direction of the strap. Such an arrangement is especially useful when the invention is implemented as a retrofit, because the existing anchor and retractor for the standard three-point seatbelt can be utilized, with only a cutting of the shoulder strap at the proper place and secure attachment of a buckle tab. A simple retrofit can be made by providing an extender unit with an extender strap 2 that fits into a standard seat-level receptacle, by cutting the single strap of the three-point seatbelt at the proper location, by attaching a buckle tab to each cut end of the strap, by leaving the lap strap anchor unit 6 as a simple anchor point, and by re-using the existing locking retractor, pretensioner, or web clamp for operation upon the shoulder strap 3. In such a retrofit, with no retractor at the lap strap anchor point 6, means should be provided for adjusting the length of the lap strap 5.

Figure 6:
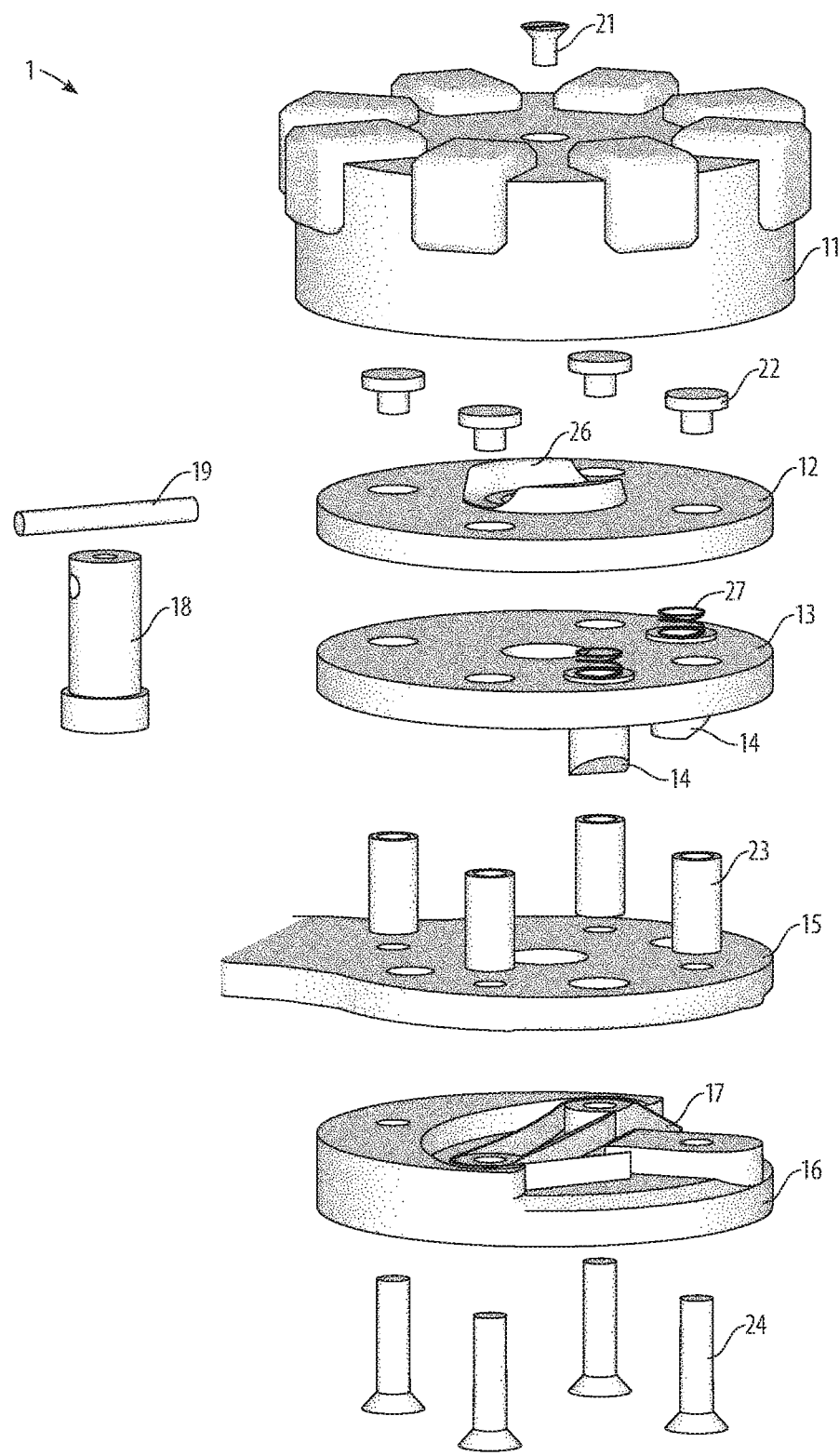
FIG. 6 is an exploded view of the continuous two-way quarter-turn sure-release receptacle of the tactical-gear-accommodating seatbelt system and method of the invention.

Referring to FIG. 6, the continuous two-way quarter-turn sure-release receptacle 1 provides an actuator knob 11 enclosing the upper portions of the continuous two-way quarter-turn sure-release receptacle 1 and providing a gripping surface for manipulation by the user. The actuator knob 11 is connected by an actuator knob connector 21 to an actuator shaft 18 through which is placed an actuator pin 19, as treated below. Not shown here, but below, is an actuator pin seat 25 on the underside interior of the actuator knob 11. A top plate 12 having a rotator cam 26 is provided at a top position. A center plate 13 having receiving pins 14 with pin springs 27 is provided below the top plate 12. A locking plate 15 is provided below the center plate 13. A bottom plate 16 having kickouts 17 is provided below the locking plate 15.

The top plate 12, center plate 13, locking plate 15, and bottom plate 16 have sets of corresponding aligned holes for connection allowing movement of the top plate 12 and center plate 13, as treated in detail below. In a preferred embodiment, as shown, there are four sets of such corresponding holes. Connection is effected with through connectors 23, upper connectors 22, and bottom connectors 24. In an embodiment, the through connectors 23 are generally tubular with a smooth exterior and a threaded interior, and the upper connectors 22 and bottom connectors 24 have corresponding threads. In the top plate 12 and center plate 13 the aligned connection holes are sized to correspond to the outer diameter of the through connectors 23, such that the top plate 12 and center plate 13 will slide along the through connectors 23. In the locking plate, the aligned connection holes are of a smaller diameter, not allowing entry of the through connectors 23, but accommodating the passage of the bottom connectors 24. The upper connectors 22 have an upper portion with a diameter greater than that of the through connectors 23, such that the top plate 12 is stopped and cannot slide past the upper connectors 22. The upper connectors 22, through connectors 23, and bottom connectors 24, when made from a suitably strong material, can provide increased lateral strength and stability to the continuous two-way quarter-turn sure-release receptacle 1, reducing the possibility of any deforming and jamming of the receptacle.

The top plate 12, center plate 13, and locking plate 15 have aligned central holes to accommodate the actuator shaft 18. The actuator shaft 18 has a uniform smaller sectional diameter in its larger upper portion, stepping out to a greater diameter at its lesser lower portion, as shown. The central holes in the top plate 12 and center plate 13 are sized to correspond to the smaller diameter of the actuator shaft 18, such as to slide along the actuator shaft 18 but not slide over the greater-diameter lower portion. The central hole in the locking plate 15 is sized to correspond to the greater diameter of the lower portion of the actuator shaft 18, such that the lower portion of the actuator shaft 18 fits into the central hole in the locking plate 15.

Figure 7:
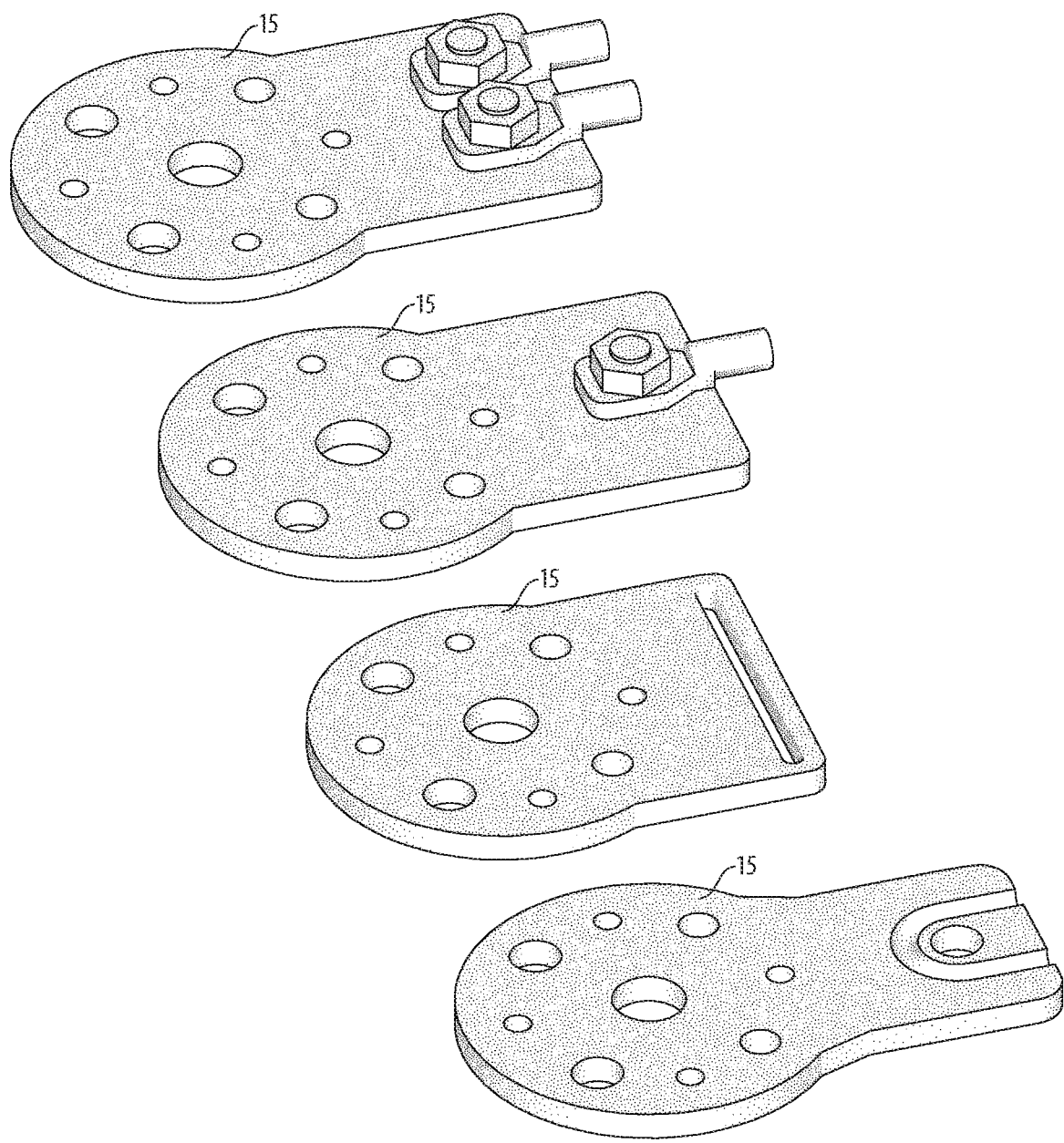
FIG. 7 is a perspective view of embodiments of the locking plate of the continuous two-way quarter-turn sure-release receptacle of the invention.

Referring to FIG. 7, the locking plate 15 can be provided in a variety of embodiments for various methods of mounting the extender strap 2. Shown are a double-cable, single-cable, web-belt eyelet, and cable-loop attachments.

Figure 8:
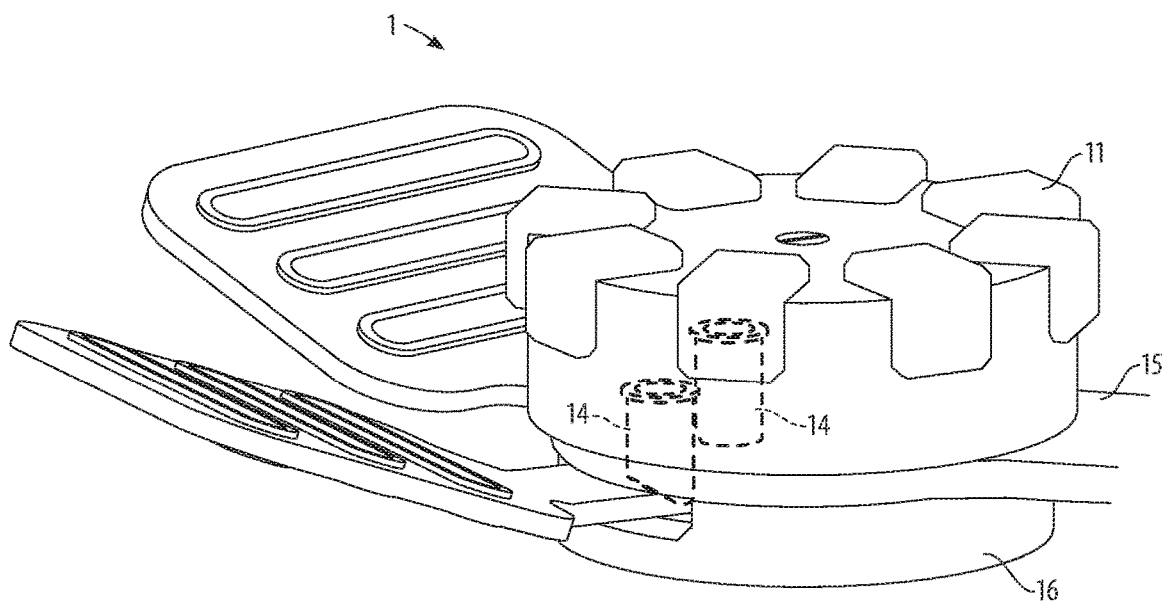
FIG. 8 is a hidden-line side view of the receiving pins of the continuous two-way quarter-turn sure-release receptacle of the invention, in use.
Figure 9:
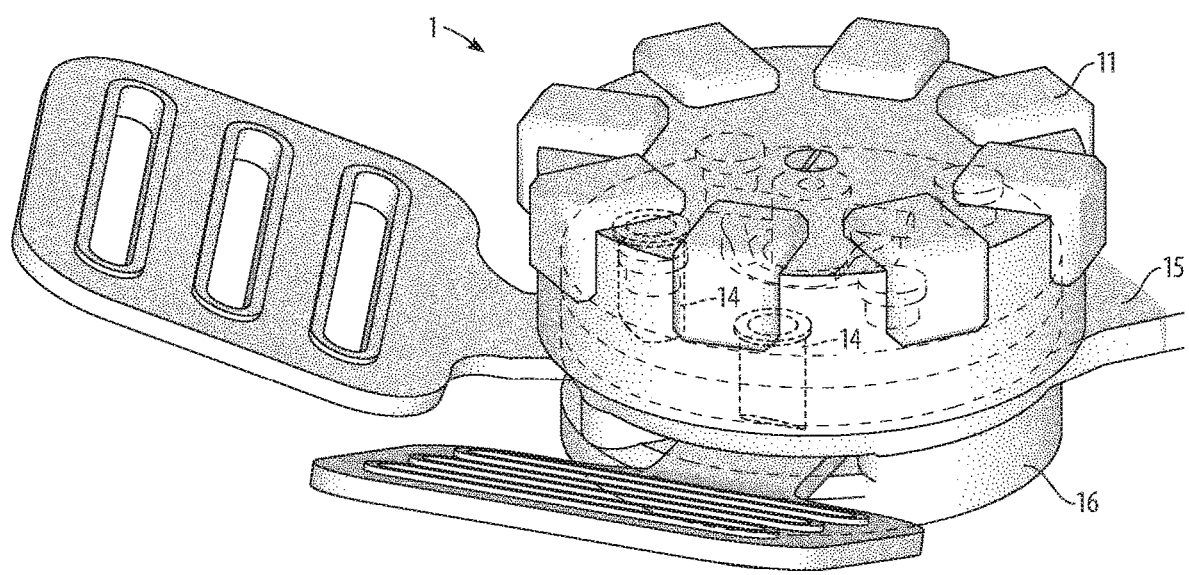
FIG. 9 is a hidden-line perspective view of the receiving pins of the continuous two-way quarter-turn sure-release receptacle of the invention, in use.

Referring to FIG. 8 and FIG. 9, in use, securing the buckle tabs, the receiving pins 14, which move with the top plate 12 and center plate 13, are lowered into and through the holes in the buckle tabs. The locking plate 15 and the bottom plate 16, mounted together, form two receiver ports. In the embodiment shown, the two receiver ports are located such that the same continuous two-way quarter-turn sure-release receptacle 1 can be used as both a driver-side and passenger-side unit. The receiving pins 14 are provided with an angled portion, as shown, which will allow a temporary raising of a receiving pin 14, against the force of a pin spring 27, when a buckle tab is pushed into a receiving port, allowing for insertion of the buckle tab when the continuous two-way quarter-turn sure-release receptacle 1 is in a closed or locked position. The top plate 12 is additionally provided with recesses on the underside corresponding to and accommodating the receiving pins 14, to allow for the temporary raising of receiving pins 14 when in a closed or locked position.

The operational design of the continuous two-way quarter-turn sure-release receptacle 1 allows use of some lighter-weight materials while maintaining a very high resistance to deforming forces which would tend to jam the continuous two-way quarter-turn sure-release receptacle 1 in a closed position, such as might happen in a collision, which might trap a person in a jammed-closed seatbelt. The actuator knob 11, top plate 12, center plate 13, and bottom plate 16 can be made from aluminium or a suitable sturdy plastic or carbon-fiber material. The actuator shaft 18, receiving pins 14, and through connectors 23 can be made from a very strong material such as stainless steel, and, because they pass through multiple plates, can increase the overall strength and stability of the continuous two-way quarter-turn sure-release receptacle 1 even where some of the plates are made from lighter materials. The receiving pins 14 should be made from a strong material very resistant to deformation, to avoid bending which might prevent the pins from retracting properly. The receiving pins 14 are guided and held in place laterally by three plates: the recesses on the underside of the top plate 12, and the holes through the center plate 13 and the locking plate 15. This increases the stability of the mounting of the receiving pins 14.

Figure 10:
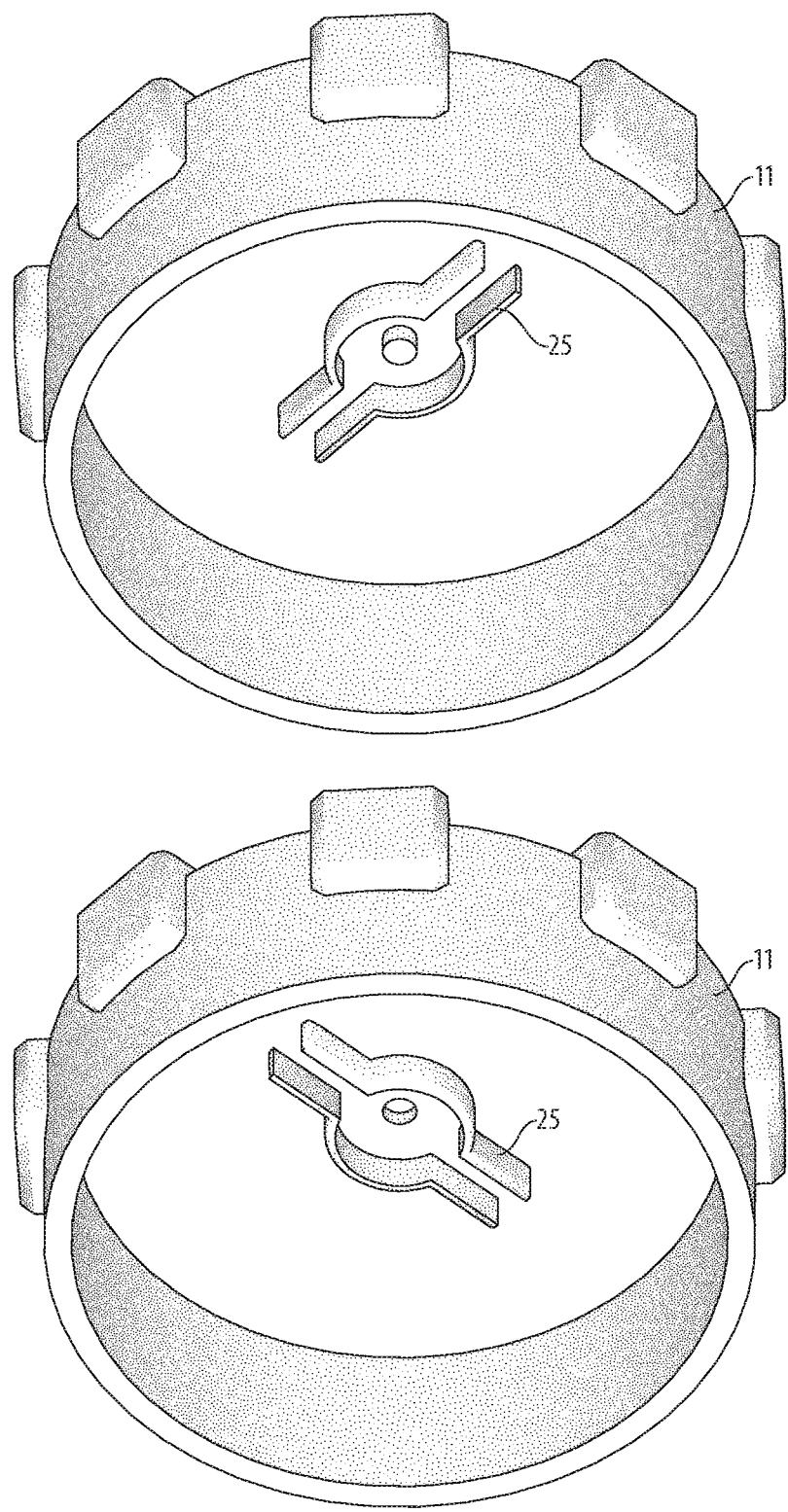
FIG. 10 is two underside views of the actuator knob and actuator pin seat of the continuous two-way quarter-turn sure-release receptacle of the invention.

Referring to FIG. 10, an actuator pin seat 25 is provided on the central upper underside interior of the actuator knob 11. The actuator pin seat 25 accommodates the upper portion of the actuator shaft 18 and the actuator pin 19 mounted through the actuator shaft 18. When the actuator knob 11 is rotated the actuator shaft 18 and actuator pin 19 are also rotated.

Figure 11:
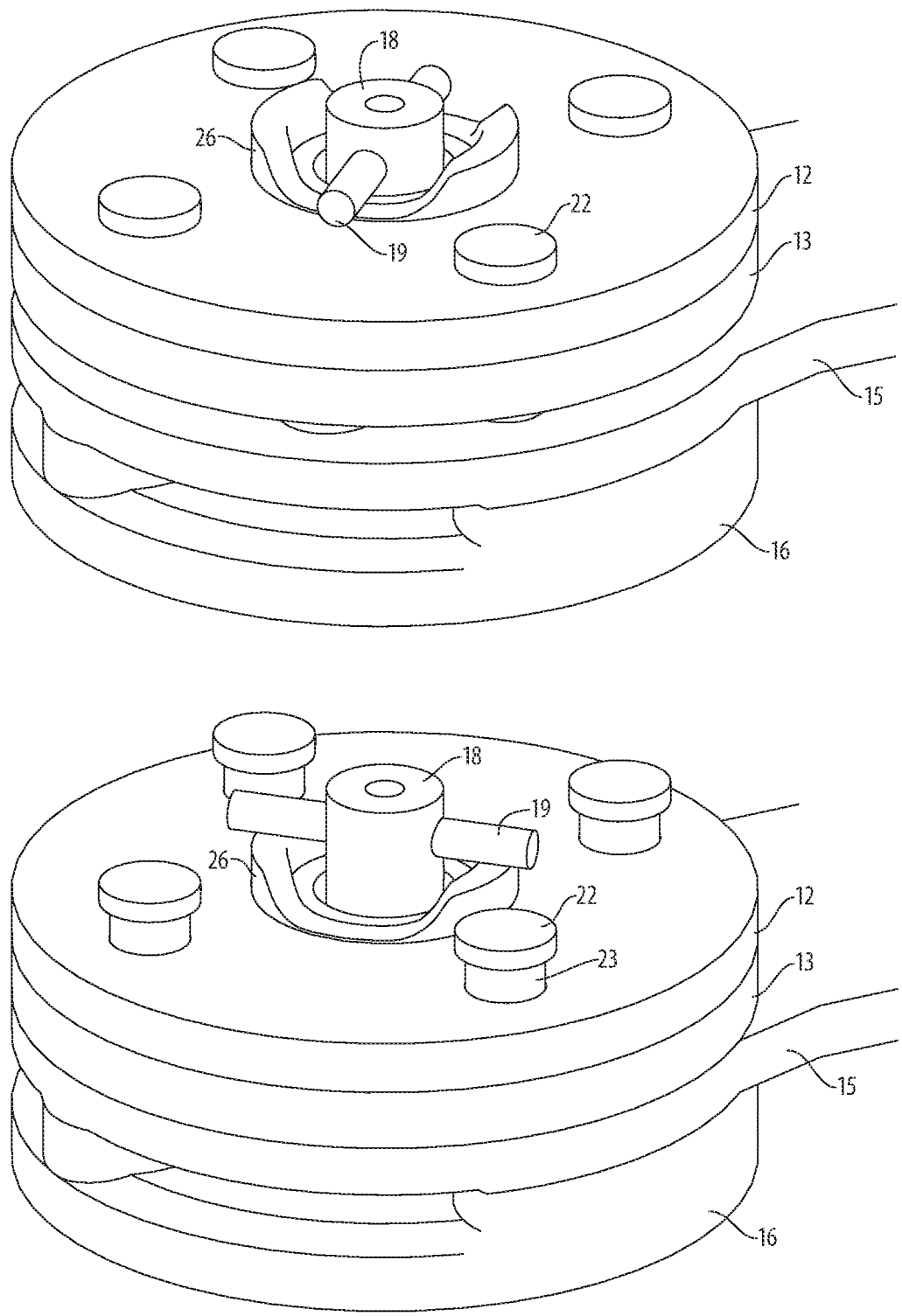
FIG. 11 is two perspective views showing the interaction of the rotator cam, actuator pin, and actuator shaft of the continuous two-way quarter-turn sure-release receptacle of the invention.

Referring to FIG. 11, the actuator pin 19 through the actuator shaft 18 makes contact with the rotator cam 26 of the top plate 12. The rotating actuator shaft 18 does not move in relation to the locking plate 15 or to the actuator knob 11. The rotator cam 26 has two opposite high points and two opposite low points as shown. When the rotating actuator shaft 18 is positioned such that the actuator pin 19 is in contact with the low points of the rotator cam 26, the top plate 12 and center plate 13 travel upward, creating a gap between the center plate 13 and the locking plate 15. The receiving pins 14, which are mounted in the center plate 13, travel with the top plate 12 and center plate 13, and are thereby raised up out of the receiver ports in the bottom plate 16. With the receiving pins 14 raised up out of the receiver ports, the continuous two-way quarter-turn sure-release receptacle 1 is in an open position, and buckle tabs will not be locked within the receiver ports. When the rotating actuator shaft 18 is positioned such that the actuator pin 19 is in contact with the high points of the rotator cam 26, the top plate 12 and center plate 13 travel downward, closing the gap and placing the center plate 13 in contact with the locking plate 15. The receiving pins 14 are thereby lowered into the receiver ports in the bottom plate 16, and the continuous two-way quarter-turn sure-release receptacle 1 is in a closed position where buckle tabs will be locked within the receiver ports. If a buckle tab has not yet been placed into the receiver port, it can be inserted and will contact the angled portion of the receiving pin 14 to temporarily raise the receiving pin 14 against the force of the pin spring 27.

Figure 12:
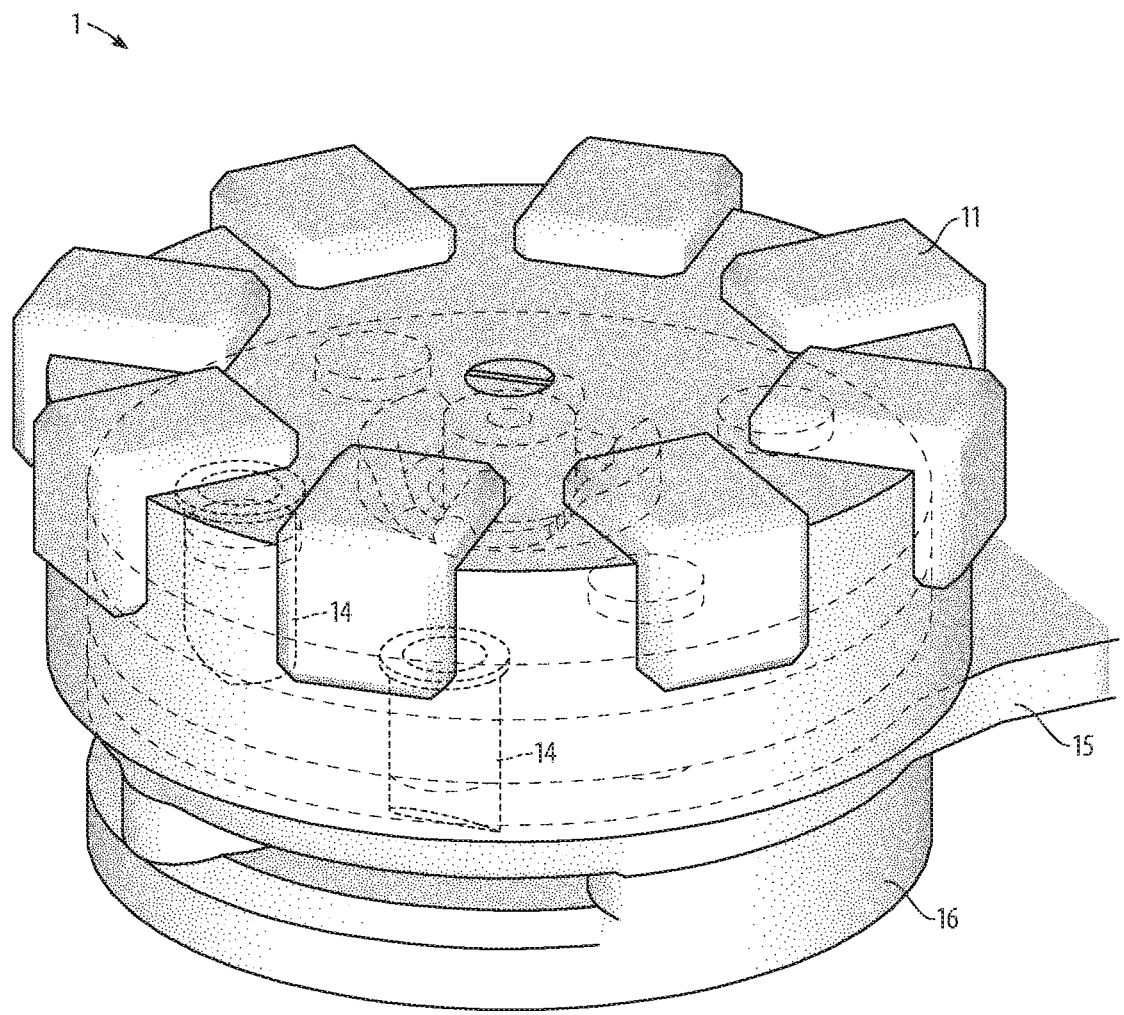
FIG. 12 is a hidden-line perspective view of the continuous two-way quarter-turn sure-release receptacle of the invention.

Referring to FIG. 12, in use, a quarter-turn rotation, in either direction, will move the receiving pins 14 between engaged and disengaged positions. The direction of the rotation does not matter to the operation of the continuous two-way quarter-turn sure-release receptacle 1. The direction of a previous locking or unlocking rotation is irrelevant to any subsequent unlocking or locking rotation. A locked continuous two-way quarter-turn sure-release receptacle 1 can always be unlocked with a quarter turn in either direction, providing easy and sure release of the restraining belts even under difficult conditions or by persons reaching into the vehicle.

Figure 13:
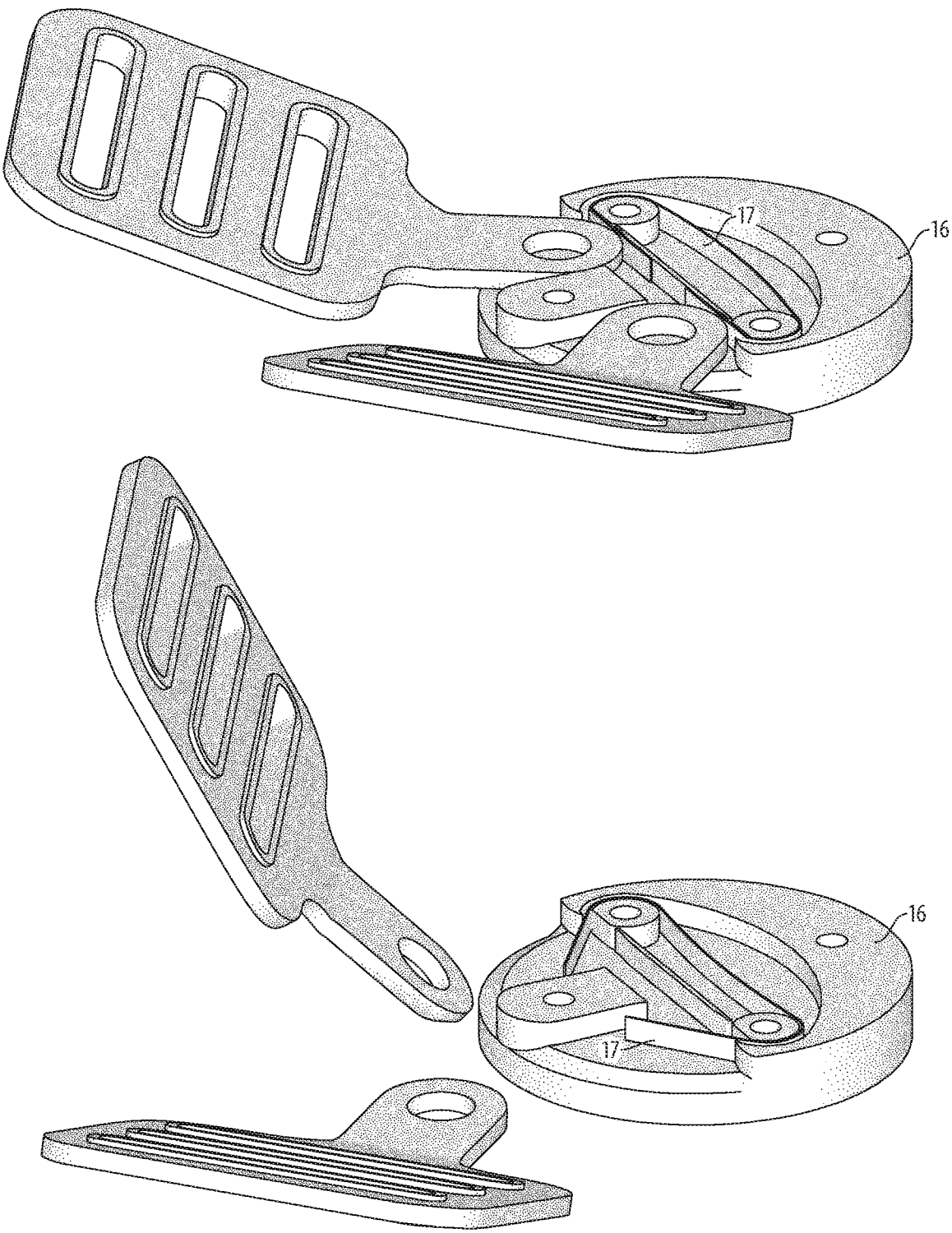
FIG. 13 is two views of an embodiment of the kickouts in the bottom plate of the continuous two-way quarter-turn sure-release receptacle of the invention, in use.

Referring to FIG. 13, the bottom plate 16 is provided with kickouts 17 to put an ejecting force on buckle tabs within the receiver ports. In the shown embodiment, the kickouts 17 are formed by a spring bar with two free ends.

Figure 14:
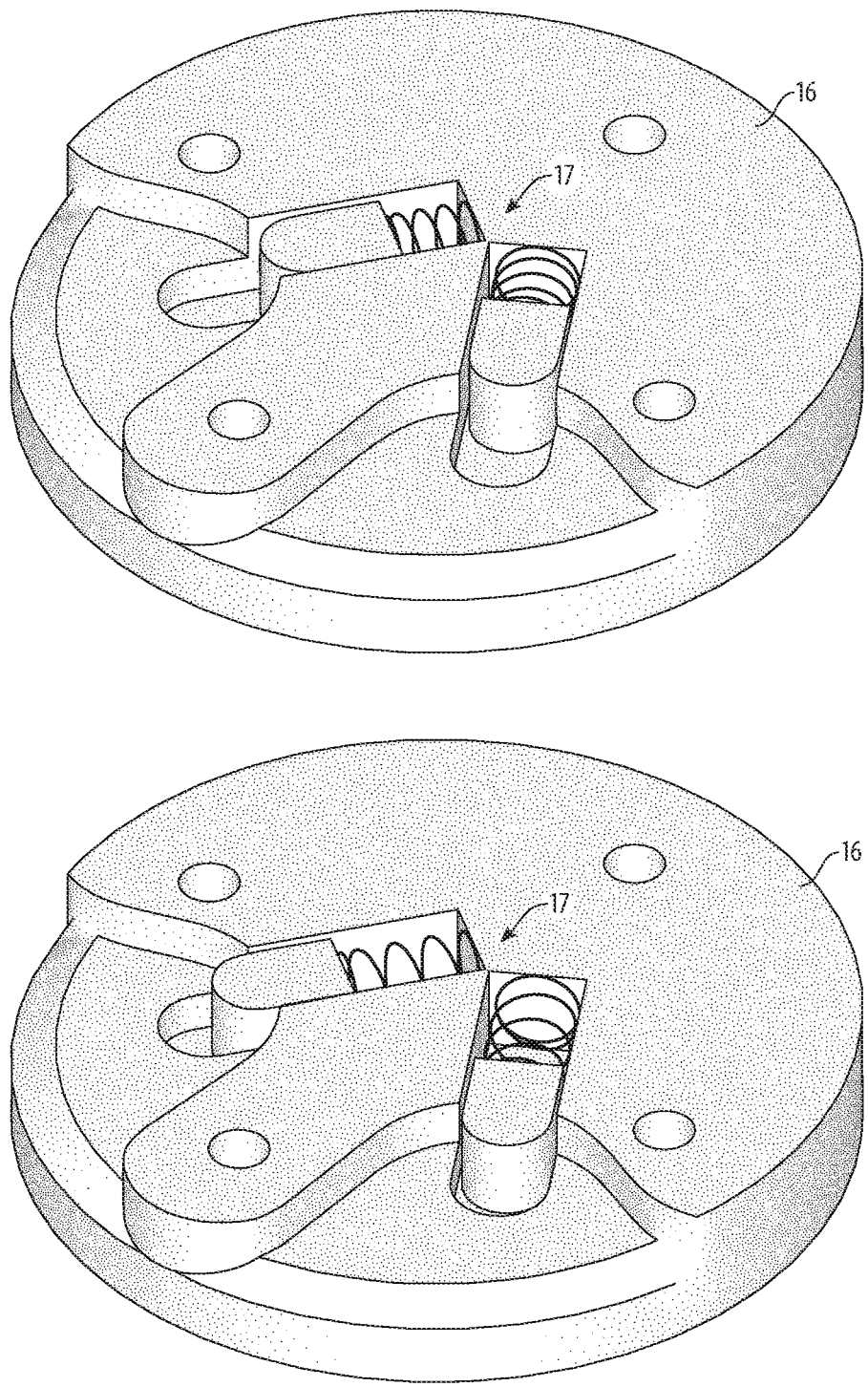
FIG. 14 is two views of another embodiment of the kickouts in the bottom plate of the continuous two-way quarter-turn sure-release receptacle of the invention.

Referring additionally to FIG. 14, the kickouts 17 can also be implemented as individual springs or spring-driven slugs or tongues. The kickouts 17, in use, will move the buckle tabs out sufficiently to prevent the receiving pins 14 from re-engaging the buckle tabs under circumstances such as, in opening the continuous two-way quarter-turn sure-release receptacle 1, turning the actuator knob 11 significantly more than a quarter turn, which might otherwise re-engage the buckle tabs.

Many other changes and modifications can be made in the system and method of the present invention without departing from the spirit thereof. I therefore pray that my rights to the present invention be limited only by the scope of the appended claims.

I claim:

1. A tactical-gear-accommodating seatbelt system apparatus for use in a vehicle by a person wearing tactical gear upon waist and front torso, said tactical-gear-accommodating seatbelt system comprising:
   (i) an extender strap ultimately anchored at a first end to a floor of the vehicle through or in place of a standard seat-level receptacle;
   (ii) a shoulder strap having at a first end an anchor point approximately at shoulder level and behind the person, and at a second end a buckle tab;
   (iii) a lap strap having at a first end an anchor point approximately at floor level of the vehicle and behind the person, and at a second end a buckle tab; and
   (iv) a continuous two-way quarter-turn sure-release receptacle attached to a second end of said extender strap having two receptacle fittings, said continuous two-way quarter-turn sure-release receptacle comprising:
      (a) an actuator knob having an actuator pin seat connected through an actuator knob connector to an actuator shaft having an actuator pin;
      (b) a top plate having a rotator cam;
      (c) a center plate having two receiving pins each having a pin spring and each adapted to engage and hold a said buckle tab;
      (d) a locking plate adapted to attach to a second end of said extender strap, and having holes adapted for the passage of said receiving pins;
      (e) a bottom plate defining two receiver ports, having kickouts adapted to eject said buckle tabs from said receiver ports; and
      (f) a plurality of upper connectors, through connectors, and bottom connectors adapted to join together said top plate, said center plate, said locking plate, and said bottom plate;
   where said continuous two-way quarter-turn sure-release receptacle is adapted to couple and uncouple with the buckle tabs of said shoulder strap and said lap strap such that the coupling will hold securely under strain and will freely uncouple after such strain;
   where said continuous two-way quarter-turn sure-release receptacle, in use, is located toward the front of the person's lower torso, and is easy to find by sight or feel, and easy to manipulate for coupling or uncoupling; and
   where the uncoupling of the buckle tabs of said shoulder strap and said lap strap from said continuous two-way quarter-turn sure-release receptacle allows said shoulder strap and said lap strap to be retracted separately and independently each of the other, thereby avoiding catching on the tactical gear.

2. The tactical-gear-accommodating seatbelt system apparatus of claim 1, further adapted to be implemented as an original seatbelt installed in a new vehicle.

3. The tactical-gear-accommodating seatbelt system apparatus of claim 1, further adapted to be implemented as a retrofit replacement for an existing standard three-point seatbelt.

4. The tactical-gear-accommodating seatbelt system apparatus of claim 1, where said extender strap ultimately anchored at a first end to the floor of the vehicle further comprises being anchored directly to the floor of the vehicle.

5. The tactical-gear-accommodating seatbelt system apparatus of claim 1, where said extender strap ultimately anchored at a first end to the floor of the vehicle further comprises being attached to a standard seat-level receptacle that is in turn anchored to the floor of the vehicle.

6. The tactical-gear-accommodating seatbelt system apparatus of claim 1, further comprising providing a locking retractor, pretensioner, or web clamp on said shoulder strap.

7. The tactical-gear-accommodating seatbelt system apparatus of claim 1, further comprising providing a locking retractor, pretensioner, or web clamp on said lap strap.

8. A tactical-gear-accommodating seatbelt method for use in a vehicle by a person wearing tactical gear upon waist and front torso, said tactical-gear-accommodating seatbelt system method comprising:
   (i) providing a tactical-gear-accommodating seatbelt system comprising:
      (a) an extender strap ultimately anchored at a first end to a floor of the vehicle through or in place of a standard seat-level receptacle;
      (b) a shoulder strap having at a first end an anchor point approximately at shoulder level and behind the person, and at a second end a buckle tab;
      (c) a lap strap having at a first end an anchor point approximately at floor level of the vehicle and behind the person, and at a second end a buckle tab; and
      (d) a continuous two-way quarter-turn sure-release receptacle attached to a second end of said extender strap having two receptacle fittings, said continuous two-way quarter-turn sure-release receptacle comprising:
         (1) an actuator knob having an actuator pin seat connected through an actuator knob connector to an actuator shaft having an actuator pin;
         (2) a top plate having a rotator cam;
         (3) a center plate having two receiving pins each having a pin spring and each adapted to engage and hold a said buckle tab;
         (4) a locking plate adapted to attach to a second end of said extender strap, and having holes adapted for the passage of said receiving pins;
         (5) a bottom plate defining two receiver ports, having kickouts adapted to eject said buckle tabs from said receiver ports; and
         (6) a plurality of upper connectors, through connectors, and bottom connectors adapted to join together said top plate, said center plate, said locking plate, and said bottom plate;
   where said continuous two-way quarter-turn sure-release receptacle is adapted to couple and uncouple with the buckle tabs of said shoulder strap and said lap strap such that the coupling will hold securely under strain and will freely uncouple after such strain;

(ii) using said continuous two-way quarter-turn sure-release receptacle at a location toward the front of the person's lower torso, where it is easy to find by sight or feel, and easy to manipulate for coupling or uncoupling; and (iii) uncoupling said buckle tabs of said shoulder strap and said lap strap from said continuous two-way quarter-turn sure-release receptacle allowing said shoulder strap and said lap strap to be retracted separately and independently each of the other, thereby avoiding catching on the tactical gear.

9. The tactical-gear-accommodating seatbelt system method of claim 8, where said tactical-gear-accommodating seatbelt system is further adapted to be implemented as an original seatbelt installed in a new vehicle.

10. The tactical-gear-accommodating seatbelt system method of claim 8, where said tactical-gear-accommodating seatbelt system is further adapted to be implemented as a retrofit replacement for an existing standard three-point seatbelt.

11. The tactical-gear-accommodating seatbelt system method of claim 8, where said extender strap ultimately anchored at a first end to the floor of the vehicle further comprises being anchored directly to the floor of the vehicle.

12. The tactical-gear-accommodating seatbelt system method of claim 8, where said extender strap ultimately anchored at a first end to the floor of the vehicle further comprises being attached to a standard seat-level receptacle that is in turn anchored to the floor of the vehicle.

13. The tactical-gear-accommodating seatbelt system method of claim 8, further comprising providing a locking retractor, pretensioner, or web clamp on said shoulder strap.

14. The tactical-gear-accommodating seatbelt system method of claim 8, further comprising providing a locking retractor, pretensioner, or web clamp on said lap strap.

\* \* \* \* \*